Oct. 30, 1928.  
W. R. McLEAN  
1,689,885  
TRACTION ATTACHMENT FOR AUTOMOBILES  
Filed March 1, 1928
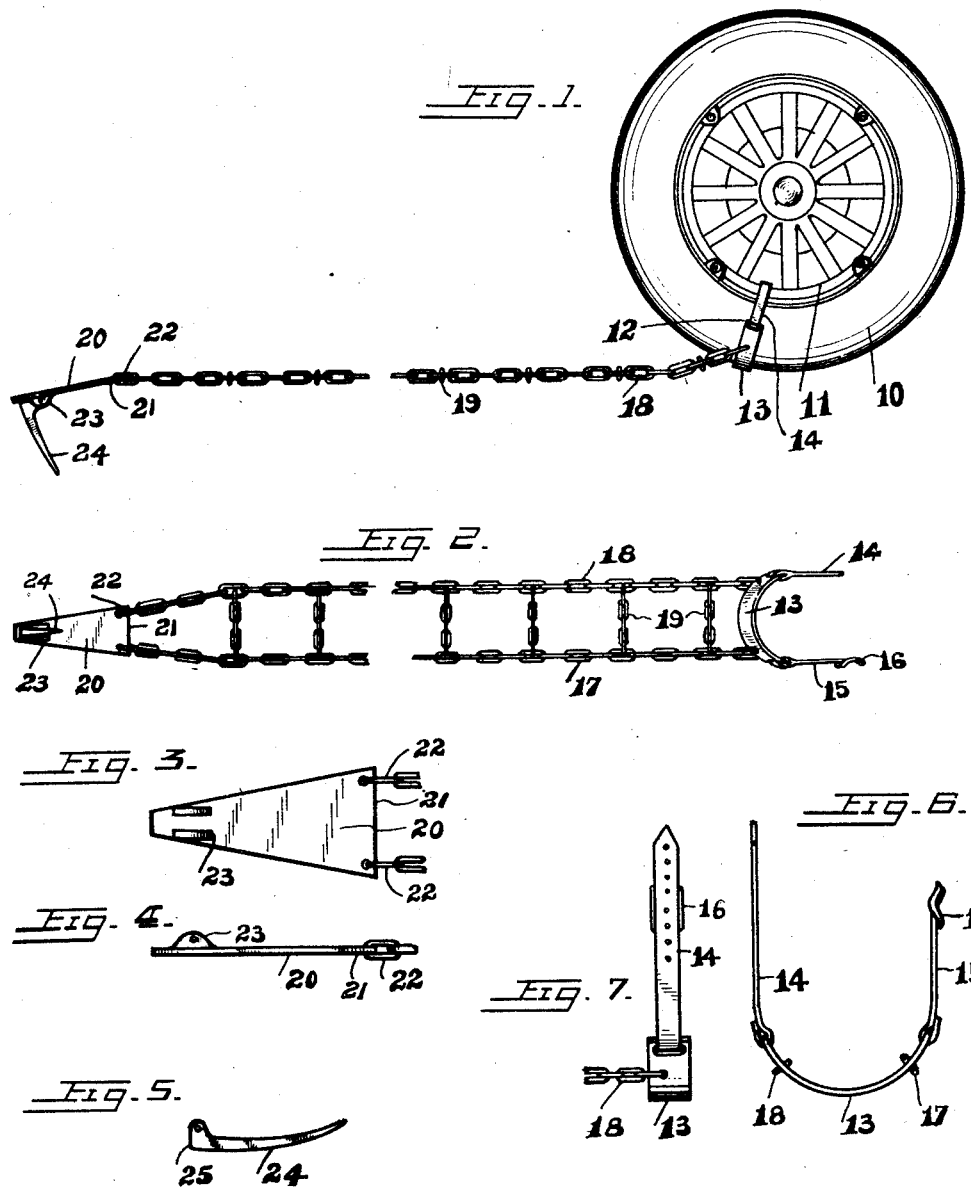

Patented Oct. 30, 1928.

1,689,885

UNITED STATES PATENT OFFICE.

WILLIAM ROBERT McLEAN, OF LOWER NAPAN, NEW BRUNSWICK, CANADA, ASSIGNOR OF ONE-HALF TO THOMAS ALEXANDER McLEAN, OF LOWER NAPAN, NEW BRUNSWICK, CANADA.

TRACTION ATTACHMENT FOR AUTOMOBILES.

Application filed March 1, 1928. Serial No. 258,283.

The invention relates to improvements in traction attachments for automobiles as described in the present specification and shown in the accompanying drawings which form part of the same.

The invention is a device for attachment to the traction wheels of an automobile to enable it to pull itself out of a ditch or rut in which it has become stuck or in which it cannot secure sufficient traction.

The invention has for its object the provision of a simple and inexpensive device of this nature which may be folded into small compass for storage purposes when not in use.

The present invention is intended to be either used singly or in pairs. It frequently occurs that one only of the traction wheels either slips or gets stuck in the rut or ditch while the other traction wheel is able to secure good traction. In this event naturally it is only necessary to employ one of these devices in order to assist the deterrent traction wheel; however in the event of both traction wheels failing to grip the contacting surface the use of a pair of such devices will be required to draw the car from its encumbrance.

The invention consists essentially of a long flexible element such as an ordinary chain use for anti-skid purposes. One end of this flexible element carries a shackle for attachment to one of the traction wheels of an automobile while the other end has an anchor which is driven into the ground so that upon starting the car and putting it in gear the rotation of the traction wheels will cause the flexible element to wrap itself around the wheel to which it is shackled and thus pull the car out of the ditch or rut. It will of course be understood that for this purpose the car should be put in low gear in order to obtain the maximum torque when setting the car in motion.

Referring to the drawings: Figure 1 is a side elevation of one of the rear traction wheels of an automobile to which the present invention is shown applied. In this view the flexible element which takes the form of a chain is stretched out flat and is shortened by breaking for purposes of convenient illustration.

Figure 2 is a view of the underside of the invention depicted in Figure 1 and is shown detached from the traction wheel.

Figure 3 is a plan view of the underside of an anchor plate to which the anchor is pivoted.

Figure 4 is a side elevation of Figure 3.

Figure 5 is a detail of the anchor.

Figure 6 is a detail of the shackle.

Figure 7 is a side elevation of the shackle.

Like numerals of reference indicate corresponding parts in each of the figures throughout the drawings.

In the drawings, the reference numeral 10 indicates the conventional automobile pneumatic tire which is mounted around the felloe 11 of one of the traction wheels. The shackle generally indicated by the numeral 12 consists of an arcuate metal plate 13 adapted to extend crosswise of the tire fitting over the tread thereof and partly up the side walls. One of the ends is attached to a flexible strap of leather material as at 14, while the other end is similarly attached to a strap 15 of similar material, the extremity of which carries a buckle 16. These straps extend up the side walls of the tire and are buckled together between the two adjacent spokes which preclude their slipping around the wheel. 17 and 18 are longitudinal chains, one end of which is secured to the plate 13, one of the chains being disposed at each side of the plate so as to lie on one side of the tread surface of the tire. These chains are connected at intervals by cross chains 19 which serve to tie them together and to permit of their wrapping around the perimeter of the tire. The opposite ends of the chains carry the anchor plate 20 which is preferably of triangular shape in plan and whose base 21 is perforated to receive the end links 22 of the chains. The apex end of the plate is provided with a pair of integral lugs 23 spaced apart and perforated. An anchor 24 is pivotally mounted in the lugs 23 and has an offset shoulder 25 which serves to limit the outward pivotal movement of the anchor so that when swung away from the plate it will assume a position approximately at right angles thereto similar to a knuckle joint. The anchor is preferably tapered as shown, particularly in Figure 5, and is curved lengthwise in the direction of pull upon the chains 17 and 18 so as to aid it in securing a firm grip in the ground.

To use this invention; the shackle is attached about the tire 10 and felloe 11 by strapping it therearound by means of the straps 14 and 15. The chains 17 and 18 are then stretched away from the wheel but in the direction of the contemplated movement of the car. The anchor is swung outwardly from the plate 20 and securely driven into the ground.

It will be readily manifest that upon motion being transmitted to the traction wheel the turning of the wheel will cause the chains to wrap around the tire and thus pull the vehicle towards the anchor freeing it from the spot in which it has become stuck. When the device is not required, the anchor 24 is folded against the plate 20 and thus occupies but little space, the device being folded up and stored in the toolbox or other convenient place.

What I claim is:—

1. A traction attachment for an automobile, comprising a shackle having a metal plate curved to fit across the tire of a traction wheel, securing means associated with said plate, a flexible element connected to the plate for wrapping around the tire, and an anchor connected to the flexible element.

2. A traction attachment for an automobile, comprising a shackle for encompassing the tire and felloe of a traction wheel thereof, said shackle consisting of an arcuate plate designed to fit over the tread and extend partially up the side walls of the tire, and straps extending from the ends of the plate for buckling over the felloe between two adjacent spokes; a flexible element connected to the plate for wrapping around the tire, and an anchor connected to the flexible element.

3. A traction attachment for an automobile comprising a shackle for encompassing the tire and felloe of a traction wheel thereof, a flexible element connected thereto for wrapping around the tire, and an anchor plate connected to the flexible element, and an anchor pivoted to the anchor plate by a knuckle joint, said anchor tapering lengthwise and being curved in the same direction.

Signed at Black River Bridge, New Brunswick, Canada, the 11th day of February, 1928.

WILLIAM ROBERT McLEAN.